United States Patent
Stuer et al.

(10) Patent No.: US 9,862,647 B2
(45) Date of Patent: Jan. 9, 2018

(54) METHOD FOR PRODUCING MEANS WITH THERMAL RESISTANCE FOR APPLYING AT A SURFACE OF A HEAT EXPOSED COMPONENT

(71) Applicant: ALSTOM Technology Ltd, Baden (CH)

(72) Inventors: Michael Stuer, Niederrohrdorf (CH); Hans-Peter Bossmann, Lauchringen (DE)

(73) Assignee: ANSALDO ENERGIA IP UK LIMITED, London (GB)

( * ) Notice: Subject to any disclaimer, the term of this patent is extended or adjusted under 35 U.S.C. 154(b) by 241 days.

(21) Appl. No.: 14/488,783

(22) Filed: Sep. 17, 2014

(65) Prior Publication Data
US 2015/0084245 A1  Mar. 26, 2015

(30) Foreign Application Priority Data
Sep. 20, 2013  (EP) .................................. 13185297

(51) Int. Cl.
*C04B 35/64*  (2006.01)
*C04B 37/00*  (2006.01)
(Continued)

(52) U.S. Cl.
CPC .......... *C04B 35/4885* (2013.01); *C04B 35/10* (2013.01); *C04B 35/48* (2013.01);
(Continued)

(58) Field of Classification Search
CPC ......... C04B 35/48; C04B 35/49; C04B 35/64; C04B 37/00; C04B 37/001
See application file for complete search history.

(56) References Cited

U.S. PATENT DOCUMENTS

| | | | |
|---|---|---|---|
| 4,758,542 A * | 7/1988 | Parker ..................... | C04B 35/49 501/105 |
| 7,723,249 B2 * | 5/2010 | Doesburg .............. | C04B 35/486 428/325 |

(Continued)

FOREIGN PATENT DOCUMENTS

EP  1772441 A1 * 4/2007  ........... C04B 35/486

*Primary Examiner* — Erin Snelting
(74) *Attorney, Agent, or Firm* — Buchanan Ingersoll & Rooney PC

(57) ABSTRACT

The invention refers to a method for producing means with thermal resist for applying at a surface of a heat exposed component. The method includes providing at least one mixture of at least two different inorganic powder materials:
   with different chemical composition and thermal expansion coefficient,
   where at least one of the powder materials experiences volume changes due to crystallographic phase change at a given temperature, and/or\
   where at least one of the two powder materials experiences volume changes due to chemical composition change,
forming the at least one mixture into a green body shape, sintering the green body to obtain a ceramic body and cooling the ceramic body and causing micro-cracking during heating and
or/sintering and/or cooling to obtain the means with thermal resist. The forming is performed such that a first mixture forming a first layer onto which a second mixture is applied forming a second layer differs in porosity from that first layer to obtain a layered green body.

20 Claims, 1 Drawing Sheet

(51) Int. Cl.
*C04B 35/488* (2006.01)
*C04B 35/10* (2006.01)
*C04B 35/48* (2006.01)

(52) U.S. Cl.
CPC ........ C04B 37/001 (2013.01); *C04B 2235/95* (2013.01); *C04B 2235/9607* (2013.01); *C04B 2237/343* (2013.01); *C04B 2237/348* (2013.01)

(56) References Cited

U.S. PATENT DOCUMENTS

| | | | | |
|---|---|---|---|---|
| 7,955,707 | B2* | 6/2011 | Xie | C04B 35/486 416/241 B |
| 7,955,708 | B2* | 6/2011 | Doesburg | C04B 35/486 416/241 B |
| 8,187,717 | B1* | 5/2012 | Xie | C04B 35/486 416/241 B |
| 2007/0082131 | A1* | 4/2007 | Doesburg | C04B 35/486 427/255.31 |
| 2010/0075147 | A1* | 3/2010 | Doesburg | C04B 35/486 428/402 |
| 2010/0247953 | A1* | 9/2010 | Bossmann | C04B 37/005 428/623 |
| 2010/0311562 | A1* | 12/2010 | Xie | C04B 35/486 501/103 |
| 2011/0003119 | A1* | 1/2011 | Doesburg | C04B 35/486 428/155 |
| 2012/0114929 | A1* | 5/2012 | Xie | C04B 35/486 428/312.8 |
| 2012/0297830 | A1* | 11/2012 | Backhaus-Ricoult | C04B 35/478 65/33.1 |

* cited by examiner

METHOD FOR PRODUCING MEANS WITH THERMAL RESISTANCE FOR APPLYING AT A SURFACE OF A HEAT EXPOSED COMPONENT

CROSS-REFERENCE TO RELATED APPLICATIONS

This application claims priority to European application 13185297.2 filed Sep. 20, 2013, the contents of which are hereby incorporated in its entirety.

TECHNICAL FIELD

The invention relates to a heat exposed component, preferably to components of a combustor, like a combustor liner, or a turbine, like vanes, blades or heat shielding elements, of a gas turbine arrangement, having a base body with a metallic surface onto which a layer of thermal barrier coating (TBC) is applied on directly or indirectly providing a continuous surface of ceramic material. Thermal stability of materials from which components are manufactured for the use in gas turbine arrangements may not be high enough to withstand process temperatures in the range above 1400° C. and above. Therefore in modern and future gas turbine arrangements great efforts must be made to protect the heat exposed components against high temperature stress. Firstly, the heat-exposed components can be cooled by means of active cooling techniques, for example by providing cooling channels inside the heat-exposed components through which cooling air is directed under pressure. Secondly, the components are covered with a heat protective layer at least in those areas which are exposed to a particularly high heat load.

Conventional heat protective layers are so called thermal barrier coatings (TBC) which are highly advanced material systems for formally insulating components from large and prolonged heat loads. TBC typically consists of four layers: the metal substrate, metallic bond coat, thermally grown oxide and ceramic top coat. The ceramic top coat is typically composed of yttria-stabilized Zirconia (YSZ).

BACKGROUND

The current thermal barrier coatings (TBCs) may reach their application limits in high advanced gas turbines due to the limited capacities to control their micro-structure from the process parameters and the reduced choice of materials suitable for thermal plasma spraying. One way to overcome these limitations is to move away from the TBC coatings and replace them with so called ceramic tiles which can be fixed on the surface of the heat exposed component with different fastening technologies.

In the document U.S. Pat. No. 4,563,128 ceramic tiles are clamped in dovetail type recesses in the flank area of a turbine blade.

The document EP 0 895 028 B1 discloses a ceramic lining for combustions spaces comprising at least one wall panel, made of a heat resistant structural ceramic. Said wall panel provides an opening through which a fastening element being arranged for fastening said wall panel to the inner wall of the combustor.

The document U.S. Pat. No. 7,198,860 B2 discloses a ceramic tile insulation for gas turbine components with a multitude of ceramic tiles which are bonded to a heat exposed surface of a gas turbine component. A first layer of individual ceramic tiles are bonded to the surface of the gas turbine component which is of ceramic material. A second layer of individual tiles is bonded on top of the first layer.

EP 1 772 441 A1 is generally related to high purity zirconia-based and/or hafnia-based materials and coatings for high temperature cycling applications. Thermal barrier coatings made from the invention high purity material was found to have significantly improved sintering resistance relative to coatings made from current materials of lower purity. The invention materials are high purity zirconia and/or hafnia partially or fully stabilized by one or any combinations of the following stabilizers: yttria, ytterbia, scandia, lanthanide oxide and actinide oxide.

The production of ceramic tiles allows a strict layered control of the microstructure on various levels in respect to grain size, pore size, porosity, pore shape and pore distribution. However, solid ceramics, equally to TBC, have a pure thermal shock and thermal gradient resistance. Therefore the current TBCs are strongly micro-cracked in addition to their high "macro-porosity" both being linked directly by the processing parameters. Micro-cracking occurs while the TBC-layer gets in contact to the cold surface of the component during the TBC-coating applied by plasma or electron beam physical vapor deposition-technique.

The constant and reproducible quality requirements for the production of ceramic tiles to be used as thermal protection in gas turbines imposes a fully controlled "defect"-free production method to limit any random effects affecting the ceramic performance. Such controlled processing methods usually result in a micro-crack-free ceramic structure. The high elastic modulus resulting from such a structure and the high thermal-mechanical formation itself may not be critical but the accompanied acoustic shock wave causes a catastrophic disintegration of the ceramic.

SUMMARY

It is an object of the invention to provide enhanced means with thermal resist for applying at the surface of a heat exposed component. Especially it is an object to optimize the heat resistance and the mechanical robustness of ceramic tiles.

The object is achieved by the sum total of the features in the independent claims 1, 2 and 3. The invention can be modified advantageously by the features disclosed in the sub claims as well in the following description especially referring to preferred embodiments.

To create micro-cracking in a ceramic body which preferably is of plate-like shape three alternative variants of a method according to the invention were found which can be combined with each other arbitrarily also. The inventive idea bases on the use of a mixture of at least two different powder materials which differ in their thermal, chemical and/or crystallographic characteristics and are the basis for producing porous ceramic bodies with micro-cracks as means with thermal resistance (e.g. a them al resist).

In a first inventive method for producing means with thermal resistance (e.g. a thermal resist) for applying at a surface of a heat exposed component the following method steps are executed: In a first step at least one mixture of at least two different inorganic powder materials with different chemical compositions and thermal expansion coefficients will be provided for forming the at least one mixture into a green body shape for further sintering the green body to obtain a ceramic body. After sintering the green body the obtained ceramic body is cooled in a cooling step while causing micro-cracking to obtain the means with thermal resistance. Micro-cracking occurs due to the different thermal expansion behavior during cooling process but can also occur during the sintering step.

Firstly, a method for producing means with thermal resist for applying at a surface of a heat exposed component comprising the following steps:
provviding at least one mixture of at least two different inorganic powder materials with different chemical composition and thermal expansion coefficient,
forming the at least one mixture into a green body shape,
sintering the green body to obtain a ceramic body and cooling the ceramic body and
causing micro-cracking during heating and/or sintering and/or cooling to obtain the means with thermal resist,
said forming is performed such that a first mixture forming a first layer onto which a second mixture is applied forming a second layer differs in porosity from that first layer to obtain a layered green body.

Secondly, a method for producing means with thermal resist for applying at a surface of a heat exposed component comprising the following steps:
providing at least one mixture of at least two different inorganic powder materials where at least one of the powder materials experiences volume changes due to crystallographic phase change at a given temperature,
forming the at least one mixture into a green body shape,
sintering the green body to obtain a ceramic body and cooling the ceramic body and
causing micro-cracking during heating and/or sintering and/or cooling to obtain the means with thermal resist,
said forming is performed such that a first mixture forming a first layer onto which a second mixture is applied forming a second layer differs in porosity from that first layer to obtain a layered green body.

Thirdly, a method for producing means with thermal resist for applying at a surface of a heat exposed component comprising the following steps:
providing at least one mixture of at least two different inorganic powder materials where at least one of the two powder materials experiences volume changes due to chemical composition change,
forming the at least one mixture into a green body shape,
sintering the green body to obtain a ceramic body and cooling the ceramic body and
causing micro-cracking during heating and/or sintering and/or cooling to obtain the means with thermal resist,
said forming is performed such that a first mixture forming a first layer onto which a second mixture is applied forming a second layer differs in porosity from that first layer to obtain a layered green body.

Type and amount of micro-crack formation inside the ceramic body during sintering and cooling can be controlled by the specific choice of powder materials to be mixed with each other.

The second alternative method for producing a thermal resist containing a specific amount of micro-cracking requires at least one mixture of at least two different inorganic powder materials where at least one of the powder materials experiences volume chances due to crystallographic phase change at a given temperature which is reached during the sintering and/or cooling process. After forming the at least one mixture into a green body shape the green body shape is sintered for obtaining a ceramic body which is cooled afterwards while causing micro-cracking due to crystallographic phase change to obtain the means with thermal resist.

In a third inventive alternative a mixture of at least two different inorganic powder materials are provided where at least on of the two powder materials experiences volume changes due to chemical composition change with an accompanying volume change. In the same way the green body will be sintered while causing micro-cracking due to chemical composition change leading to volume changes of at least one of the two powder materials.

The formation of micro-cracks can be control by special selection of powder materials and by a special mixing ratio of the powders which are mixed together. Generally, the larger the difference is between the properties concerning thermal expansion coefficient, crystallographic phase change or chemical composition change which all accompany volume changes, the more, greater and longer cracks will occur.

Also the "macro"-porosity of the ceramic body can be controlled by the incorporation of so called pore formers into the powder mixture before processing and sintering so that porosity and amount of micro-cracks can be adjusted to each other in a controlled manner.

As mentioned above all three inventive methods can be combined in arbitrary combinations, i.e. powder materials of different or the same chemical composition providing different characteristics concerning volume changes depending on temperature can be mixed together for providing the mixture forming the green body shape for further sintering and cooling.

In a preferred embodiment after cooling the ceramic body for obtaining the means with thermal resistance (e.g. a thermal resist) at least one heat treatment cycle is performed for further adjusting length and density of micro-cracks in the means with thermal resistance. The heat treatment cycle can be a further sintering process followed by a cooling step in which the means with thermal resistance can be exposed to temperatures up to 1200° C. to 1600° C. Such thermal cycles can be repeated several times.

The means with thermal resistance (e.g. a thermal resist) can be of any shape but in a preferred embodiment the means provide a plate-like shape, like a tile. Such plate-like components preferably have a plate thickness between 1 mm to 10 mm respectively 3 mm to 6 mm. The plate-like components typically have a rectangular shape providing a surface size of 1 cm$^2$ to 30 cm$^2$. Such plate-like components enable the realization of heat resistant cover around regions of heat exposed components which are part of a gas turbine arrangement like combustor liner, vanes, blades or heat shield elements in a turbine unit. The plate-like components can be joined directly to the surface for example of a combustion liner or a blade of a gas turbine preferably by brazing so that the heat impact onto the heat exposed components can be reduced significantly.

The plate-like components which consist of a micro-cracked ceramic have a porosity in the range of 1% to 40% by volume which is ideally between 10% to 25% by volume. The porosity can be influenced by pore forming techniques, mainly by fugitive pore formers which are mixed into the mixture of the at least two different inorganic powder materials before forming the green body shape.

Further it is possible to choose powder materials to be mixed such that the plate-like component provides a single homogenous micro-structure in the entire volume of the component. Also it is possible to produce means with thermal resist, preferably in form of a shape-like component with a graded-layered structure in respect to the plate thickness where each layer can have different micro-crack and/or porosity levels. To do this the forming process is performed such that a first mixture forming a first layer onto which a second mixture is applied forming a second layer differs in porosity level from the first layer. As mentioned below in combination with an illustrated preferred embodiment it is of advantage to have at least a three layered shape like component providing a bottom, middle and top layer of which the middle layer provides a porosity level which is higher than the porosity level of the bottom and top layers, so that the bottom and top layer have a higher level of erosion resistance. Additionally it is possible to add some fiber content into at least one of the layers of the graded layer structure.

"Porosity" or "void fraction" is a measure of the void (i.e., "empty") spaces in a material, and is a fraction of the volume of voids over the total volume, between 0 and 1, or as a percentage between 0 and 100%. There are many ways to test porosity in a substance or part. The term "porosity" is used in multiple fields including ceramics, metallurgy, materials, etc. Porosity is defined by the ratio:

$$\phi = \frac{V_V}{V_T},$$

where $V_V$ is the volume of void-space and $V_T$ is the total or bulk volume of material, including the solid and void components. The mathematical symbol $\varphi$ is used to denote porosity.

A preferred combination of at least two different inorganic powder materials represents aluminum oxide ($Al_2O_3$) and zirconium oxide ($ZrO_2$). Further oxides are also suitable to form the at least one mixture: $BeO$, $TiO_2$, $Al_2TiO_5$, $BaTiO_3$, $SiO_2$, $HfO_2$, $MgO$. Also it is possible to combine carbides and nitrides of the following elements Al, Zr, Hf, Si, Mg, Ti.

Especially Zirconium oxide provides the ability of crystallographic phase change between monoclinic, cubic and tetragonal structure accompanying with a volume change. The crystallographic phase change occurs at special temperatures which will be reached during sintering and cooling. Also aluminum oxide shows crystallographic phase change between α, gamma and θ crystallographic structure.

The scope of the invention however is not limited to the above cited materials.

BRIEF DESCRIPTION OF THE DRAWINGS

The invention shall subsequently be explained in more detail based on exemplary embodiments in conjunction with the drawing. In the drawing FIG. 1 illustration of process steps according to the methods of claims 1 and 2, and FIG. 2 illustration of process steps according to the method of claim 3.

DETAILED DESCRIPTION

Figure 1:
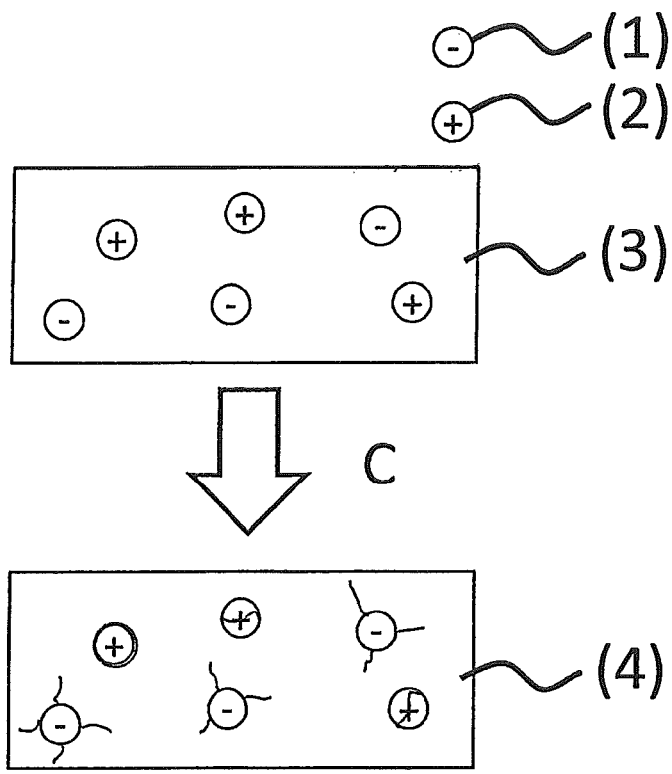

As mentioned before the micro-crack structure in the means with thermal resistance (e.g. a means with thermal resist) preferably in shape of a plate-like component can be controlled by the type and ratio between the at least two different powder materials which are mixed together for obtaining the mixture. Both different powders 1, 2, see FIG. 1, can be mixed as individual particles or in an agglomerated form. Preferably but not necessarily it is possible to incorporate a pore former which is not shown in FIG. 1 into the mixture 3. In case of FIG. 1 the particles or agglomerates 1 which are marked by a "−" shall have a low thermal expansion coefficient and the particles or agglomerates 2 which are marked by a "+" shall have a high thermal expansion coefficient. In combination with the before characteristics or alternatively the particles or agglomerate 1 shall show crystallographic phase changes with volume increase or no phase change if the particles or agglomerates 2 will show a crystallographic phase change. On the other hand the particles or agglomerates 2 shall show crystallographic phase change with volume decrease or no phase change if particles or agglomerates 1 show a crystallographic phase change.

The appropriately selected particles 1, 2 will be mixed together to obtain a mixture 3 which is formed to a green body shape being sintered at high temperature. Said forming is performed such that a first mixture forming a first layer onto which a second mixture is applied forming a second layer differs in porosity from that first layer to obtain a layered green body. At least after sintering crack formation will occur during cooling C inside the ceramic body 4. In case of the particles or agglomerates 1 surrounded by a matrix of the particles or agglomerates 2 cracks start at the interface between both materials going into the matrix.

In case of the particles or agglomerates 2 surrounded by a matrix of particles or agglomerate 1 cracks occur and propagate along the interface or divide the particles or agglomerates 1. Both crack formation are shown in FIG. 1 lower illustration.

Figure 2:
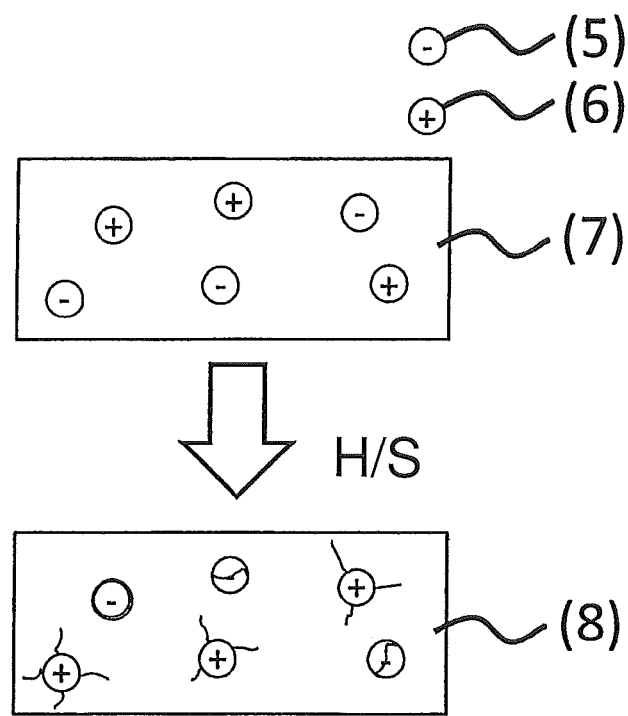

FIG. 2 shows the case in which the powder materials differ in chemical composition changes accompanying with volume change. Particles or agglomerates 5 marked by "−" shall show a non-reversible phase change during sintering resulting in a volume decrease. Particles or agglomerates 6 shall show a non-reversible phase change during sintering resulting in a volume increase. The green body 7 consisting of the mixture of the particles or agglomerates 5 and 6 will be heated and sintered H/S while crack formation occur. For the particles or agglomerates 6 surrounded by a matrix consisting of particles or agglomerates 5 a cracks start at the interface going into the matrix 5. In case of particles or agglomerates 5 surrounded by a matrix of particles or agglomerates 6 cracks occur and propagate along the interface to divide the type 5 particles or agglomerates.

The invention claimed is:

1. A method for producing means shaped as a tile with thermal resistance for applying at a surface of a heat exposed component; the method comprising:
   providing at least two mixtures of at least two different inorganic powder materials with different chemical composition and thermal expansion coefficient,
   forming the at least two mixtures into a green body,
   sintering the green body formed from the at least two mixtures to obtain a ceramic body shaped as a tile,
   cooling the ceramic body shaped as a tile, and
   causing micro-cracking during heating and/or the sintering and/or the cooling to obtain the means shaped as a tile with thermal resistance,
   wherein said forming is performed such that a first mixture forming a first layer is applied onto a second mixture forming a second layer to form the green body, the second layer differing in porosity from the first layer.

2. The method according to claim 1, wherein the providing of the at least two mixtures is performed such that the at least two different inorganic powder materials differ from each other in at least one of the following properties: thermal expansion coefficient, crystallographic phase change, and chemical composition change during sintering and/or cooling.

3. The method according to claim 1, further comprising:
after the causing of the micro-cracking and the cooling, performing at least one heat treatment cycle of further sintering that exposes the means with thermal resistance to a temperature of 1200° C. to 1600° C. and subsequent cooling for adjusting length and density of micro cracks.

4. The method according to claim 1, wherein a volume change of the at least one powder material takes place during the sintering to cause the micro cracking.

5. The method according to claim 1, wherein said forming of the at least two mixtures into a green body is performed such that the resulting means with thermal resistance has a rectangular plate-like shape having a thickness of between 3 mm to 6 mm and a surface area of between 1 cm$^2$ to 30 cm$^2$.

6. The method according to claim 1, further comprising after cooling, shaping the sintered ceramic body for applying on a surface of the heat exposed component.

7. The method according to claim 1, wherein at least two different inorganic powder materials are selected from the following materials: $Al_2O_3$, $ZrO_2$, BeO, $TiO_2$, $Al_2TiO_5$, $BaTiO_3$, $SiO_2$, HfO, $HfO_2$, MgO, Carbides and Nitrides of Al, Carbides and Nitrides of Zr, Carbides and Nitrides of Hf, Carbides and Nitrides of Si, Carbides and Nitrides of Mg, Carbides and Nitrides of Ti.

8. The method according to claim 1, wherein the means shaped as a tile with thermal resistance are joined onto the surface of the heat exposed component by brazing.

9. The method according to claim 1, wherein the heat exposed component is a component of a gas turbine arrangement being exposed to hot gases.

10. The method according to claim 1, wherein said forming of the at least two mixtures into a green body is performed such that the resulting means with thermal resistance has a rectangular plate-like shape having a thickness between 1 mm to 10 mm and a surface area of between 1 cm$^2$ to 30 cm$^2$.

11. The method according to claim 1, wherein the means shaped as a tile with thermal resistance has a porosity of 1% to 40% by volume.

12. The method according to claim 1, wherein the forming is performed such that a third mixture forming a third layer is applied onto the second layer to form the green body such that the first layer forms a top of the green body, and the third layer forms a bottom of the green body and the second layer is between the first and third layers, the second layer having a porosity that is greater than a porosity of the first layer and is also greater than a porosity of the third layer.

13. A method for producing means shaped as a tile with thermal resistance for applying at a surface of a heat exposed component; the method comprising:
providing at least two mixtures of at least two different inorganic powder materials where at least one of the powder materials experiences volume changes due to crystallographic phase change at a given temperature,
forming the at least two mixtures into a green body,
sintering the green body formed from the at least two mixtures to obtain a ceramic body shaped as a tile,
cooling the ceramic body shaped as a tile, and
causing micro-cracking during heating and/or the sintering and/or the cooling to obtain the means shaped as a tile with thermal resistance,
wherein said forming is performed such that a first mixture forming a first layer is applied onto a second mixture forming a second layer to form the green body, the second layer differing in porosity from the first layer.

14. The method according to claim 13, wherein the volume changes due to crystallographic phase change at a given temperature based on a change of monoclinic to tetragonal crystal structure of the at least one of the at least two different inorganic powder materials.

15. The method according to claim 13, wherein at least two different inorganic powder materials are selected from the following materials: $ZrO_2$ monoclinic, $ZrO_2$ cubic, $ZrO_2$ tetragonal, $Al_2O_3$ alpha, $Al_2O_3$ gamma, and $Al_2O_3$ theta.

16. The method according to claim 13, wherein the means shaped as a tile with thermal resistance has a porosity of 1% to 40% by volume; and the method also comprises:
after the causing of the micro-cracking and the cooling, performing at least one heat treatment cycle of further sintering that exposes the means with thermal resistance to a temperature of 1200° C. to 1600° C. and subsequent cooling for adjusting length and density of micro cracks.

17. The method according to claim 13, wherein the forming is performed such that a third mixture forming a third layer is applied onto the second layer to form the green body such that the first layer forms a top of the green body, and the third layer forms a bottom of the green body and the second layer is between the first and third layers, the second layer having a porosity that is greater than a porosity of the first layer and is also greater than a porosity of the third layer.

18. A method for producing means with thermal resistance for applying at a surface of a heat exposed component; the method comprising:
providing at least two mixtures of at least two different inorganic powder materials where at least one of the at least two different inorganic powder materials experiences volume changes due to chemical composition change,
forming the at least two mixtures into a green body,
sintering the green body formed from the at least two mixtures to obtain a ceramic body shaped as a tile,
cooling the ceramic body shaped as a tile, and
causing micro-cracking during heating and/or the sintering and/or the cooling to obtain the means with thermal resistance,
wherein said forming is performed such that a first mixture forming a first layer is applied onto a second mixture forming a second layer to form the green body, the second layer differing in porosity from the first layer.

19. The method according to claim 18, wherein the at least two different inorganic powder materials comprises at least a first inorganic powder material that comprises particles or agglomerates experiencing a non-reversible phase change during sintering resulting in a volume decrease, and at least a second inorganic powder material that comprises particles or agglomerates experiencing a non-reversible phase change during sintering resulting in a volume increase; and the method also comprises:
after the causing of the micro-cracking and the cooling, performing at least one heat treatment cycle of further sintering that exposes the means with thermal resistance to a temperature of 1200° C. to 1600° C. and subsequent cooling for adjusting length and density of micro cracks.

20. The method according to claim 18, wherein the forming is performed such that a third mixture forming a third layer is applied onto the second layer to form the green body such that the first layer forms a top of the green body, and the third layer forms a bottom of the green body and the second layer is between the first and third layers, the second layer having a porosity that is greater than a porosity of the first layer and is also greater than a porosity of the third layer.

* * * * *